United States Patent [19]

Gaskins

[11] Patent Number: 4,644,401

[45] Date of Patent: Feb. 17, 1987

[54] APPARATUS FOR COMBINING GRAPHICS AND VIDEO IMAGES IN MULTIPLE DISPLAY FORMATS

[75] Inventor: Arthor L. Gaskins, La Mesa, Calif.

[73] Assignee: Morris K. Mirkin, Beverly Hills, Calif.

[21] Appl. No.: 666,118

[22] Filed: Oct. 29, 1984

[51] Int. Cl.$^4$ .......................................... H04N 5/272
[52] U.S. Cl. ...................................... 358/183; 358/22
[58] Field of Search ................. 358/183, 185, 181, 22, 358/903

[56] References Cited

U.S. PATENT DOCUMENTS

| | | | |
|---|---|---|---|
| 3,580,993 | 5/1971 | Sandorf | 358/183 |
| 4,486,774 | 12/1984 | Maloomian | 358/183 |
| 4,530,009 | 7/1985 | Mizokawa | 358/183 |
| 4,539,585 | 9/1985 | Spackova | 358/183 |

*Primary Examiner*—Tommy P. Chin

*Attorney, Agent, or Firm*—Brown, Martin, Haller & Meador

[57] ABSTRACT

An apparatus provides a signal for operating a display device to display combined video and graphics images in plural, selectable scene formats. The apparatus permits selection of a scene format containing an image and has respective sources providing video and graphics image signals. Based upon a selected scene format and the graphics image signal, the apparatus determines when, during display of the scene, an image is to be displayed, and selects from the video and graphics image signals to provide a display signal whose characteristics are based upon the selected image signal. The selectable formats include one displaying a video image alone, one displaying a graphics image superimposed on a video image, one including a graphics image embedded in a predetermined background, and one corresponding to a uniform foreground which curtains an image behind it.

10 Claims, 10 Drawing Figures

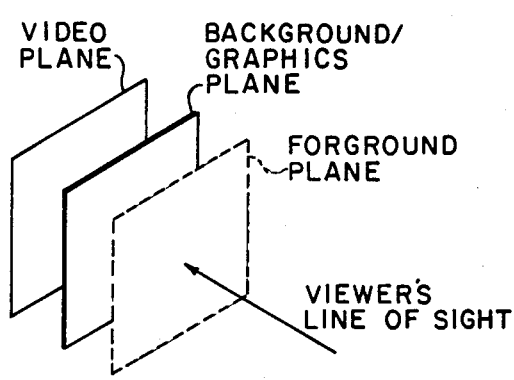
FIG. 6
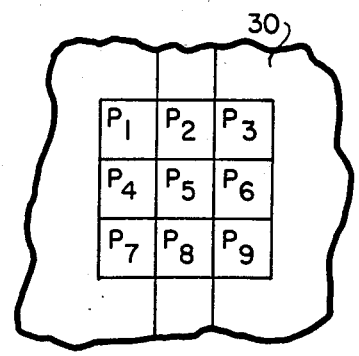
FIG. 4
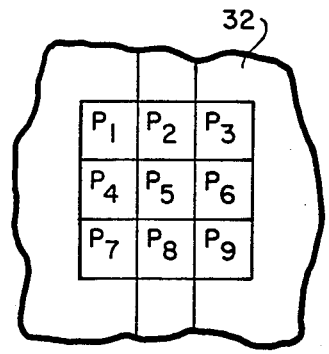
FIG. 5
FIG. 10
FIG. 3

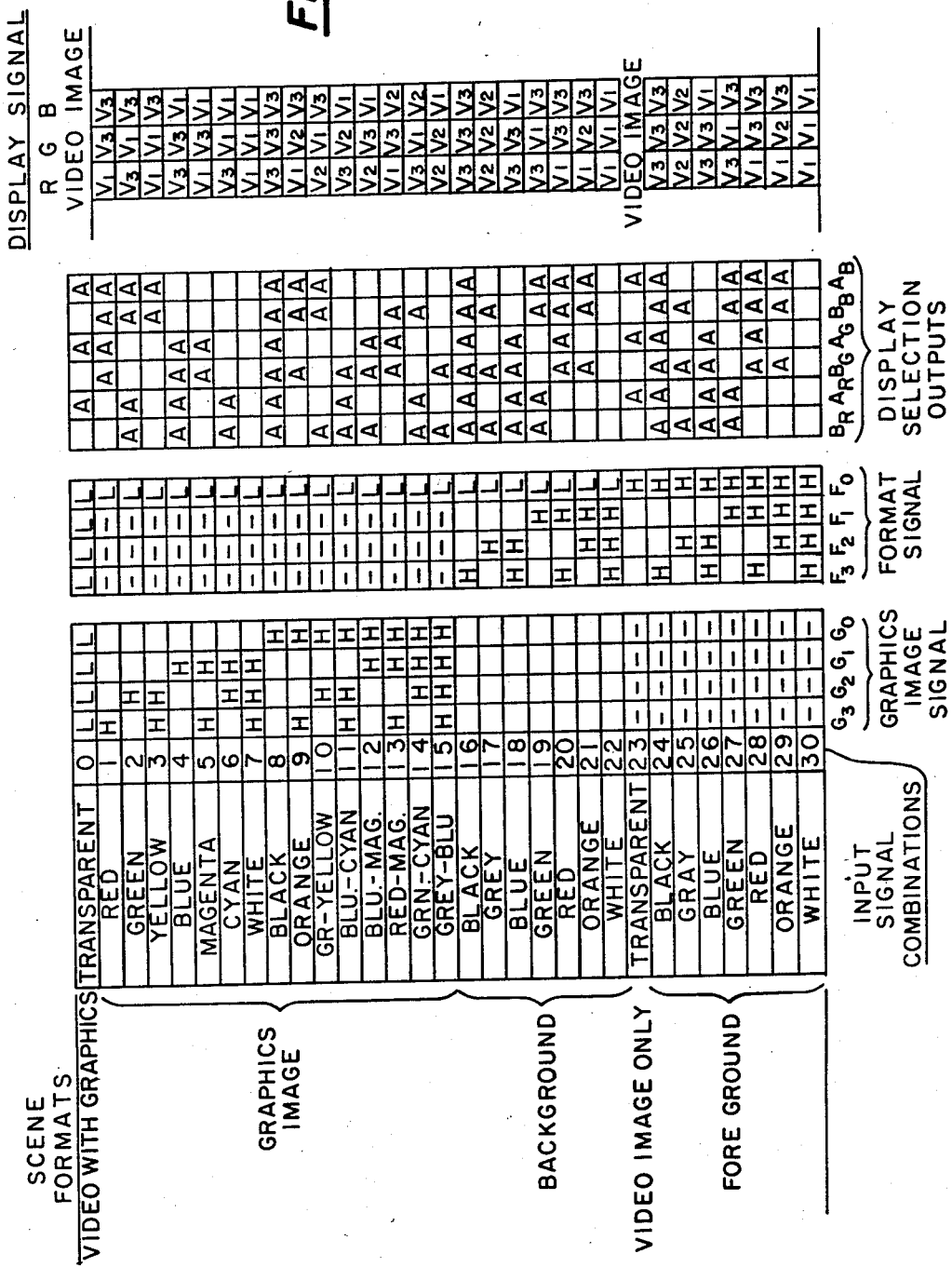

APPARATUS FOR COMBINING GRAPHICS AND VIDEO IMAGES IN MULTIPLE DISPLAY FORMATS

BACKGROUND OF THE INVENTION

The invention is in the field of image display composition, and more particularly is in the field of systems which combine graphics and video images for display on a single display device.

In systems which utilize a display to represent and explain services to interested persons, it is often desirable to display a scene including video and graphics imagery. For example, the display of program material with spoken narrative explanation will be incomprehensible to a deaf person. However, the provision of written narrative in a section of the program display will permit a deaf person to comprehend both the visual and verbal content of the program. Manifestly, the written portion must be presented on the same display as the visual program if the deal viewer is to appreciate the verbal and visual segments simultaneously.

One way of providing the written verbal narrative on the same display is to utilize a conventional graphics generator to generate common alphanumeric characters. Normally, the operation of the generator is directed by a program controller which would insure that the written verbal content output by the generator is synchronized with the visual presentation.

In other applications, it is useful to provide a display system which can display not only written program narration, but a board set of graphics images and symbols which can be displayed in any combination with video images. Such a system would be flexible and adaptable to a wide variety of uses.

Therefore, it is evident that there exists a need for a display apparatus having the capability of enabling the display of both graphics and video images in a variety of combinations.

SUMMARY OF THE INVENTION

The present invention is an apparatus which, under the control of a format selection processor, combines video and graphics image signals from respective sources to produce a display signal suitable for causing a display device to show the images in a variety of selectable scene formats.

The apparatus of the invention includes a video signal generator which provides a signal representative of a video image, a graphics generator which provides a graphics signal representative of a graphics image, and a control device which selects one of a plurality of scene formats in which one or more of the images is to be displayed and provides a signal representative of the selected format. A format control and composition circuit responds to the format signal by selectively processing the video and graphics signals to produce a display signal which causes the display to present the selected scene format containing the image to be displayed.

The format control composition circuit processes image signals by selecting, in response to the format signal, and in synchronism with the video signal, a portion of an image signal representative of a portion of an image to be displayed. The circuit then produces a display signal consisting of a sequence of selected image signal portions. The display signal is provided by the format control and composition circuit in synchronism with the video signal.

The invention also contemplates a method of combining video and graphics signals to produce a display signal which causes a display device to display one or more of the images in multiple, selectable formats. The method includes the steps of selecting a display format, selecting, in response to the selected format, and in synchronism with the video signal, a portion of an image signal representative of a portion of an image to be displayed, and synchronously providing a sequence of selected image signal portions as the display signal.

Therefore it is an object of the present invention to provide an improved apparatus for providing a display signal which causes a display device to combine video and graphics images and to display the combined images in multiple, selectable formats.

A further objective of the present invention is to provide an apparatus which combines video and graphics signals in selectable ways which permit the display of the combined images in multiple, selectable formats.

A further object of the present invention is to provide a method for combining video and graphics image signals to produce a display signal which causes a display device to display one or more of the images in multiple, selectable formats.

Other objects and further advantages of the disclosed invention will become more apparent when the following detailed description is taken together with the described drawings.

BRIEF DESCRIPTION OF THE DRAWINGS

FIG. 3 illustrates a segment of a selected scene format wherein a graphics image is displayed against a predetermined background.

FIG. 4 is a magnified portion of the selected scene illustrated in FIG. 1.

FIG. 5 is a magnified portion of the scene segment illustrated in FIG. 3.

FIG. 6 is a conceptual drawing illustrating the concept of the invention.

FIG. 9 is a state diagram of the programmed logic array which forms a part of the select logic of the format control and composition circuit.

FIG. 10 is a table illustrating how the output states of the FIG. 9 state table control the selection of image signal portions which are provided as a display signal to the red gun of a color display device.

DETAILED DESCRIPTION OF THE PREFERRED EMBODIMENT

Figure 1:
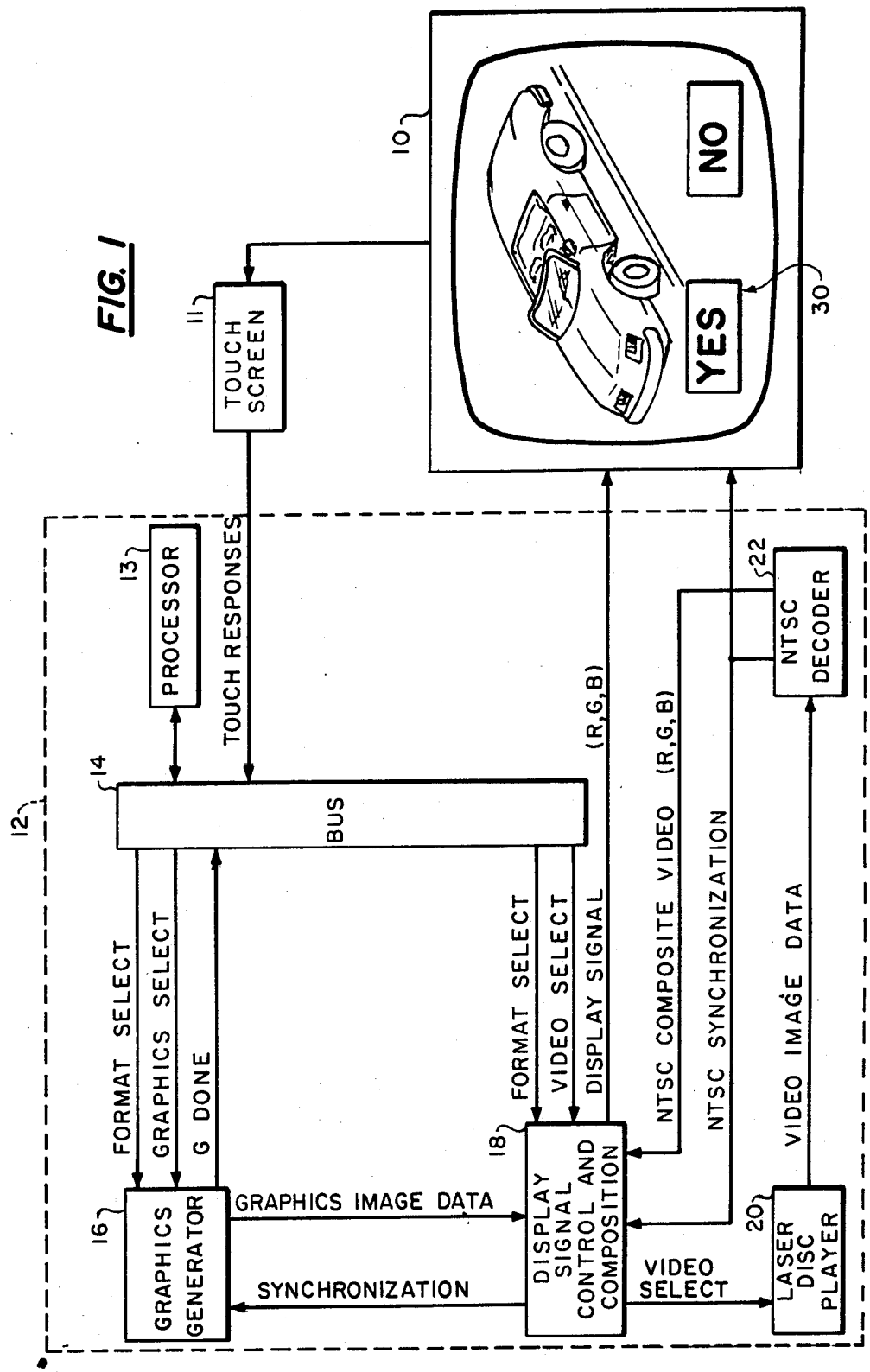
FIG. 1 is a block diagram illustrating the use of the apparatus of the invention in a display system.

The system of the invention is illustrated in a typical operational environment in FIG. 1. In FIG. 1 a conventional three-gun, color CRT display 10 is included in a system which interacts with a user to perform, for example, an automobile leasing transaction. In order to inform the customer of the automobiles which are available to be leased, moving video images of the automobiles are displayed on the screen of the display 10. One or more graphics images can be displayed together with the images of the automobile to indicate the customer's acceptance or non-acceptance of a pictured automobile. For example, the graphics images may consist of the words YES and NO which are enclosed in respective boxes on the lower part of the display screen.

A customer indicates his response to touching one of the boxes and a conventional touch screen apparatus 11 provides an indication of the box which has been touched.

Depending upon the customer's decision, another image of an automobile may be projected together with the decision boxes should the customer decide not to accept the initially displayed automobile. Alternatively, if the customer decides to accept the automobile, another image may be shown, for example, a scene comprising a listing in alphanumeric graphic images of the different rental plans available for the selected automobile.

Displays such as that indicated by 10 and touch screen systems which perform the functions required of the touch screen apparatus 11 are well-known in the art. In the arrangement just described, the display is required to display scenes which comprise both video and graphics images separately or in combination. The touch screen apparatus 11 provides a signal indicating when a particular display is to be changed. In this operational application, the apparatus of the invention (indicated by 12 in FIG. 1) can respond to the signals provided by the touch screen apparatus 11 by selecting a scene format in which one or more video or graphics images are to be displayed. The apparatus 12 further selects one or more images to be displayed in the selected format and composes a display signal which is effective to cause the display 10 to display the selected images in the selected format.

The apparatus 12 includes a control processor 13 which is connected conventionally to a typical bus interface 14 comprising address, data, and control lines. The bus 14 interconnects the processor 13 with the touch screen 11. The bus 14 also interconnects the processor 13 with a graphics generator 16 and a display format control and composition circuit 18. The processor accesses a laser disc player 20 through the control and composition circuit 18, and the disc player 20 is connected to a conventional NTSC decoder 22.

The processor 13 can comprise, for example, a microprocessor which is conventionally programmed to execute a format and image selection routine, described in greater detail below. In the preferred embodiment, the control processor 13 includes a microprocessor available from Zylog, Inc., under the tradename Z-80.

The graphics generator 16 is connected to be controlled over the bus interconnection 14 by the processor 13. Both FORMAT SELECT and GRAPHICS SELECT signals are provided by the processor to the graphics generators. The FORMAT SELECT signal indicates the scene format which has been selected for display. If the selected scene is to contain a graphics image, the image is indicated by the GRAPHICS SELECT signal. In response to the FORMAT and GRAPHICS SELECT signals, the generator generates and provides a graphics image signal representative of a graphics image selected by the processor 13, The operation of the graphics generator 16 is synchronized to the video image signal and to the operation of the display 10 by the provision of an SYNCHRONIZATION signal from the control and composition circuit 18.

Selection of video images is made by the processor 13 which passes a VIDEO SELECT signal to the control and composition circuit 18. The VIDEO SELECT signal is indicative of a storage location on a laser disc, not shown, which is conventionally used by the laser disc player 20. Video images are extracted from the indicated laser disc locations and provided by the player 20 as video image data to the NTSC decoder 22 which processes the video image data into conventional NTSC composite video format and provides the formatted video image signal to the control and composition circuit 18.

As is typical, the NTSC decoder also provides a composite NTSC synchronization signal. The NTSC synchronization signal is fed to the display 10 which responds to it and to the DISPLAY signal to display the selected images in the selected format according to the well-known, two dimensional scanning technique.

The synchronized graphics image and composite video image signals are fed to the display format control and composition circuit 18 which combines them in a manner described hereinbelow to produce the DISPLAY signal. The DISPLAY signal comprises components for operating the red, green and blue (R, G, B) guns of the display device 10.

There are a variety of available equipments and devices which can be used to perform after "certain" functions certain of the apparatus 12 illustrated in FIG. 1. For example, the graphics generator 16 can include a high resolution color graphics generator available under the equipment number STD-C-GDC-1024 from Antares Technology Associates, Inc., San Diego, Calif. The laser disc player 18 can include a Pioneer LDV1000 layer disc player which operates using a laser disc having a video track which is divisible into separate, uniquely addressable sections, each of which can conventionally store video image data.

Figure 2:
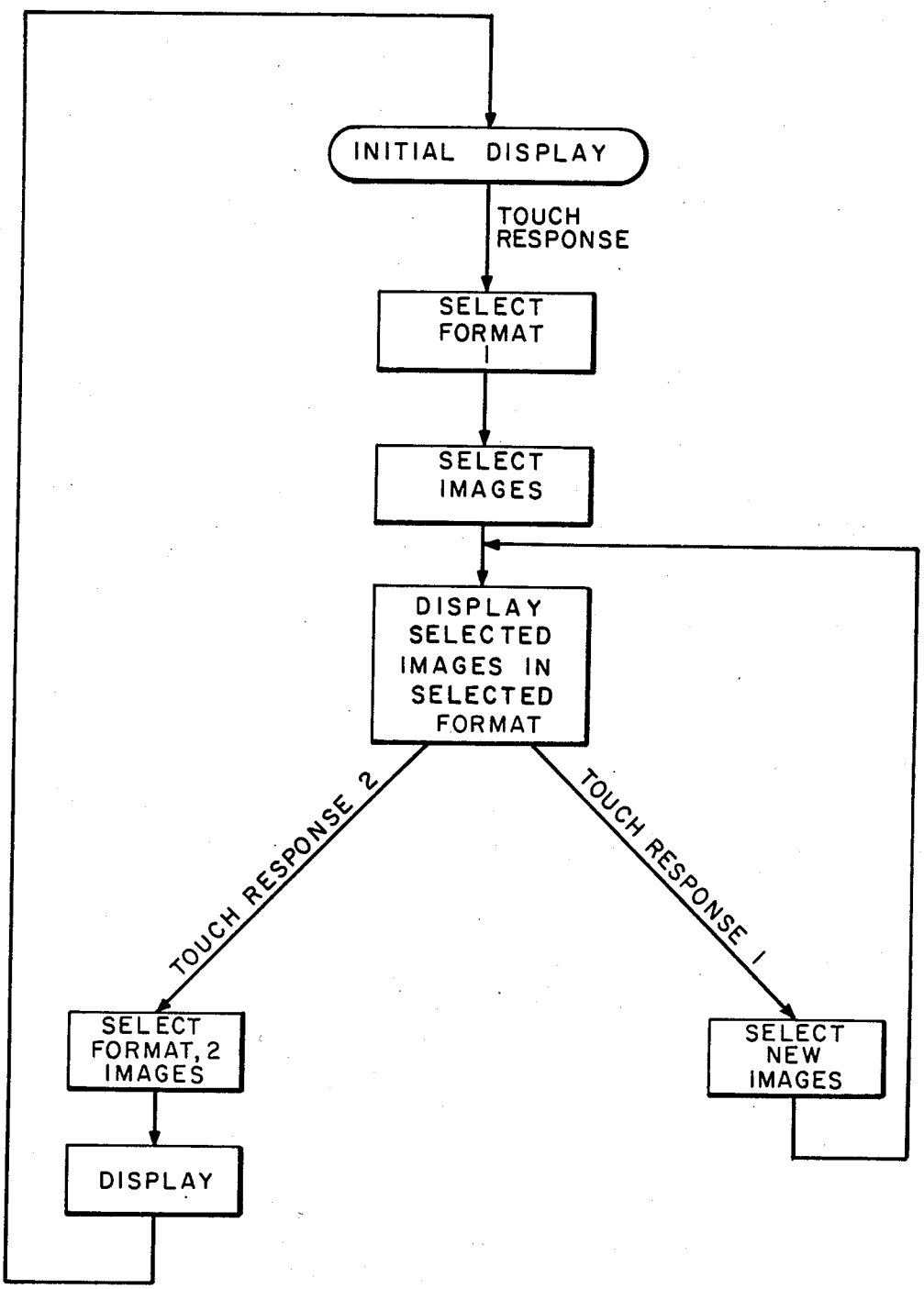
FIG. 2 illustrates a portion of a system routine for operating the FIG. 1 system to display video and graphics images in multiple, selectable scene formats.

When the apparatus of the invention operates in conjunction with a user-interactive setup such as the touch-screen display 10, the control processor 13 can be appropriately programmed to select various formats and images for display on the display device 10 in response to touch indications received from the touch screen apparatus 11. For example, the processor may be programmed as illustrated by the flow chart of FIG. 2 to output an initial screen showing a video image including a moving automobile. This display can be obtained, for example, from an appropriately addressed section of the laser disc included in the disc player 20. The processor also controls the graphics generator 16 to produce a graphics message directing a person to touch the screen if he wishes to rent an automobile. Both the graphics image comprising the message to the user and the video image comprising the scene of the moving automobile are provided to the display control and composition circuit 18 which combines them to produce the DISPLAY signal.

The initial scene is displayed until a customer, desiring to rent a car, touches the screen, which action is detected by the touch screen apparatus 11 which provides an appropriate touch response signal to the processor 13.

When the touch response signal is received by the processor 13, its operational program selects a scene format which, for the purposes of illustration, can be characterized as format 1, and selects images to be displayed according to the selected format.

The processor 13 then sends appropriate FORMAT and graphics select signals to the graphics generator 16 indicating a selected format and a graphics image, if one is included in the format, and a VIDEO SELECTION signal which is passed through the control and composition circuit 18 to the disc player 20, indicating a selected video image if the scene includes one. At the same time the FORMAT SELECT signal, indicating the format selected, is also provided to the display format and composition circuit 18, which causes the circuit to combine the selected graphics and video image signals in a manner determined by the format control signal and to provide the combined signals as the DISPLAY signal.

The selected format 1 can include the scene illustrated on the display of FIG. 1. In this case, the selected video image would be of a moving automobile while the selected graphics image would comprise the alphanumeric characters enclosed in the respective rectangles. Now, the selection of another scene format and another image or images to be presented will depend upon which rectangle has been touched in the scene illustrated on the display 10 of FIG. 1. In case the NO image is touched, the touch screen apparatus 11 will provide an appropriate signal to the processor 13 indicating the customer's rejection of the displayed automobile. This may be characterized as TOUCH RESPONSE 1 in FIG. 2.

In the case of TOUCH RESPONSE 1 the processor 13 will select another video image illustrating another automobile and will display that image together with the previously-selected graphics image in format 1. This process can be repeated until a YES response, characterized as TOUCH RESPONSE 2 in FIG. 2 and indicating selection of the displayed automobile, is received.

When the YES response to received by the processor 13, it can select a new scene format, different from format 1, and a new set of images to be displayed according to the new format. A representative new format would include a written verbal representation of leasing rate plans which would be available to the customer for the selected automobile. This could comprise, for example, a list of time periods for which the car could be rented, each displayed with the current rental rate applying to that period. The listing can be displayed as a solely graphics image including the graphics symbols necessary to present the list. The display of a graphics image according to format 2 is illustrated in FIG. 3.

Returning to FIG. 2, after the format 2 list has been displayed for a predetermined period of time, the processor 13 returns to its initial state, reselects the initial state images and format, and the apparatus of the invention operates the display 10 to provide the initial display.

The operation of the display format control and composition circuit 18, which is central to the operation of the apparatus 12 of the invention, can be understood with reference to FIGS. 4-6. As is conventional, a scene is presented on the display 10 in composite, scanned NTSC video format which is a time sequence of analog traces, each trace representing the three-color RGB (red, green, blue) signal along a horizontal sweep line of the scene. Each horizontal sweep line is composed of a sequential array of individual picture elements or pixels, each representing a small portion of the displayed scene which is scanned by the horizontal line. Subdividing the scanned scene in this manner produces a set of pixels in a two-dimensional array with each pixel individually identified by its coordinates in the array.

FIG. 4 illustrates a 3×3 matrix of pixels from the location indication by 30 in the scene presented by the display 10 in FIG. 1. The pixels in the matrix of FIG. 4 are arbitrarily numbered for purposes of illustration only. In the format of the FIG. 1 scene, a portion of the graphics image generated and provided by the generator 16 and comprising a portion of the right hand vertical side of the box containing the message YES includes pixels $P_2$, $P_5$, and $P_8$. The other pixels of the matrix represents portions of the road included in the video image extracted from the laser disc player 20. The control and compositions circuit 18 controls the characteristics of the DISPLAY signal so that, while it is tracing the segment of the horizontal line containing pixels $P_1$–$P_3$ those characteristics are determined by the composite video image signal while the DISPLAY signal is tracing the portion of the scene occupied by the pixels $P_1$ and $P_3$. Similarly, while the DISPLAY signal is providing the park of the scene occupied by the pixel $P_2$, its characteristics are determined by the portion of the graphics image signal supplied by the generator 16 which defines that portion of the YES box.

A portion 32 of the FIG. 3 scene is magnified in FIG. 5 where the 3×3 pixel array now spans the symbol numeral 1 which is presented against a uniform background. As with the scene portion illustrated in FIG. 4, that part of the symbol including pixels $P_2$, $P_5$, and $P_8$ are drawn by portions of the DISPLAY signal whose characteristics are determined by the graphics image signal from the generator 16. The background portions including the other pixels are determined by the FORMAT signal supplied to the control and composition circuit 18 in a manner described hereinbelow.

The formats among which the processor selects to specify the general form of the scene presented by the display 10 can be understood with reference to FIG. 6. In FIG. 6 three planes are shown which are selectively activated by the apparatus of the invention in order to establish a scene format. When a video image is to be included in the format, it is displayed on what may be considered a video plane. When a graphics image is to be displayed embedded in a selected background, the video plane is blocked by the activation of background/graphics plane, with the selected image being presented on the background. In the case where a graphics image is to be superimposed onto a video image, the background/graphics plane is made transparent, everywhere except where the graphics image is to be displayed. With this arrangement, the graphics image overlays the video plane to produce the effect illustrated in the FIG. 1 scene.

In the case where the control processor 13 selects a large or complex graphics image for display, it may be that the graphics generator 16 requires a measurable amount of time to reconfigure itself for generation of the image. In this case it would be desirable to block the graphics plane while the image is being generated until such time as the graphics generator 16 has configured itself to generate the image. A foreground format is provided for this purpose which essentially consists of transferring the background/graphics plane from its position to a point in front of where the graphics image is to be displayed so that it is placed between the viewer and the asembling graphics image. Then, activation of the foreground plane will block the display of any of the planes behind it until such time as an image is ready for display on its respective plane. When the image is ready for display, the foreground plane can be shifted back to the position of the background plane. In this position it can either be made transparent if video and graphics images are to be displayed together or it can be activated with a selected background if only graphics images are to be displayed.

The apparatus of the invention therefore has the ability to select one from a plurality of display formats. In one format a video image extracted from the disc player 20 is displayed alone. In the second format, a graphics image generated by the graphics generator 16 is superimposed on a video image from the disc player. Another format presents a graphics image against a selected background. Finally, in the foreground format, the display of any image is curtained by a uniform foreground.

Figure 7:
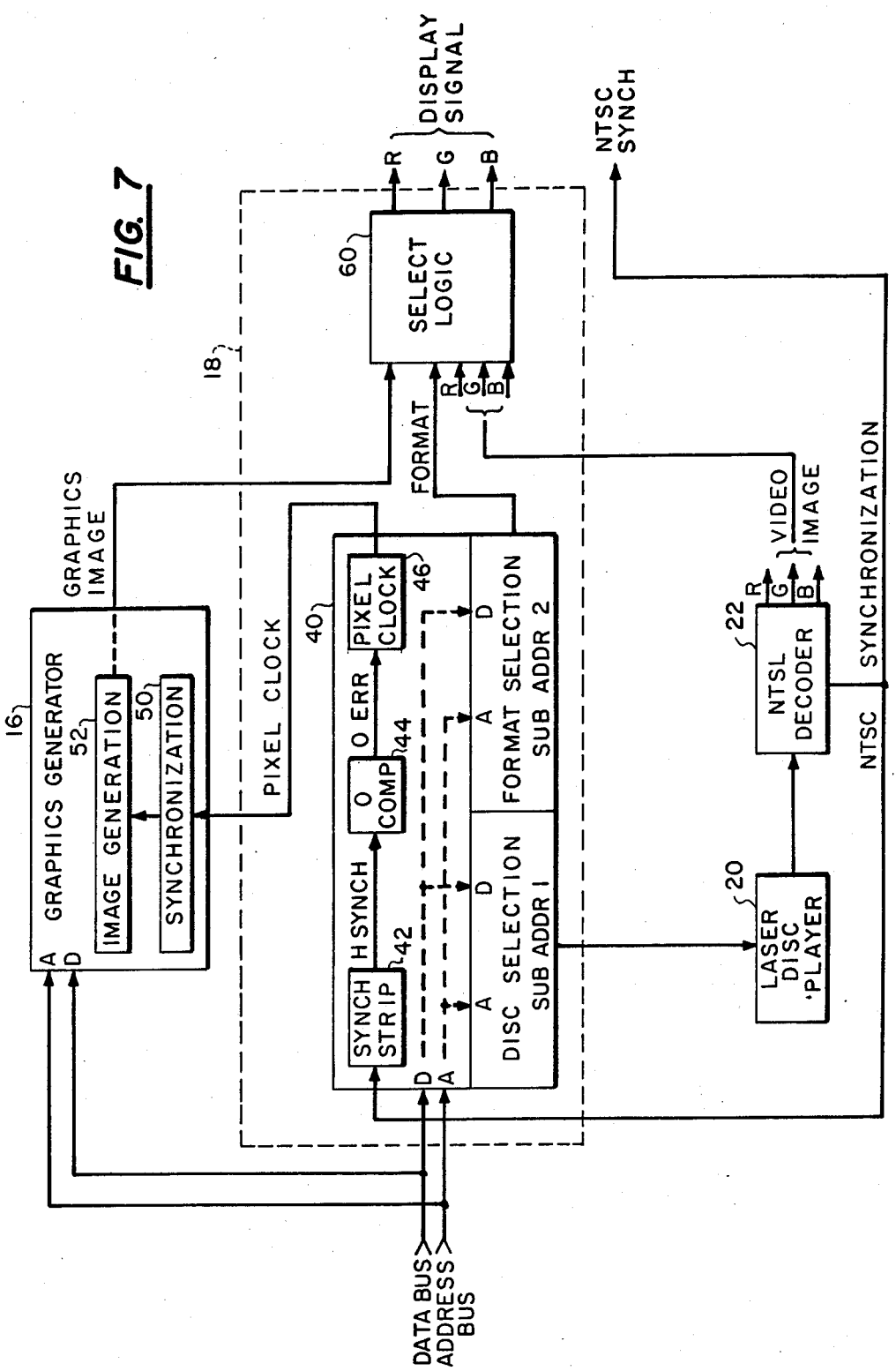
FIG. 7 is a partial schematic diagraph illustrating the format control and composition circuit of the invention and its interconnection with video and graphics image signal generators.
Figure 8:
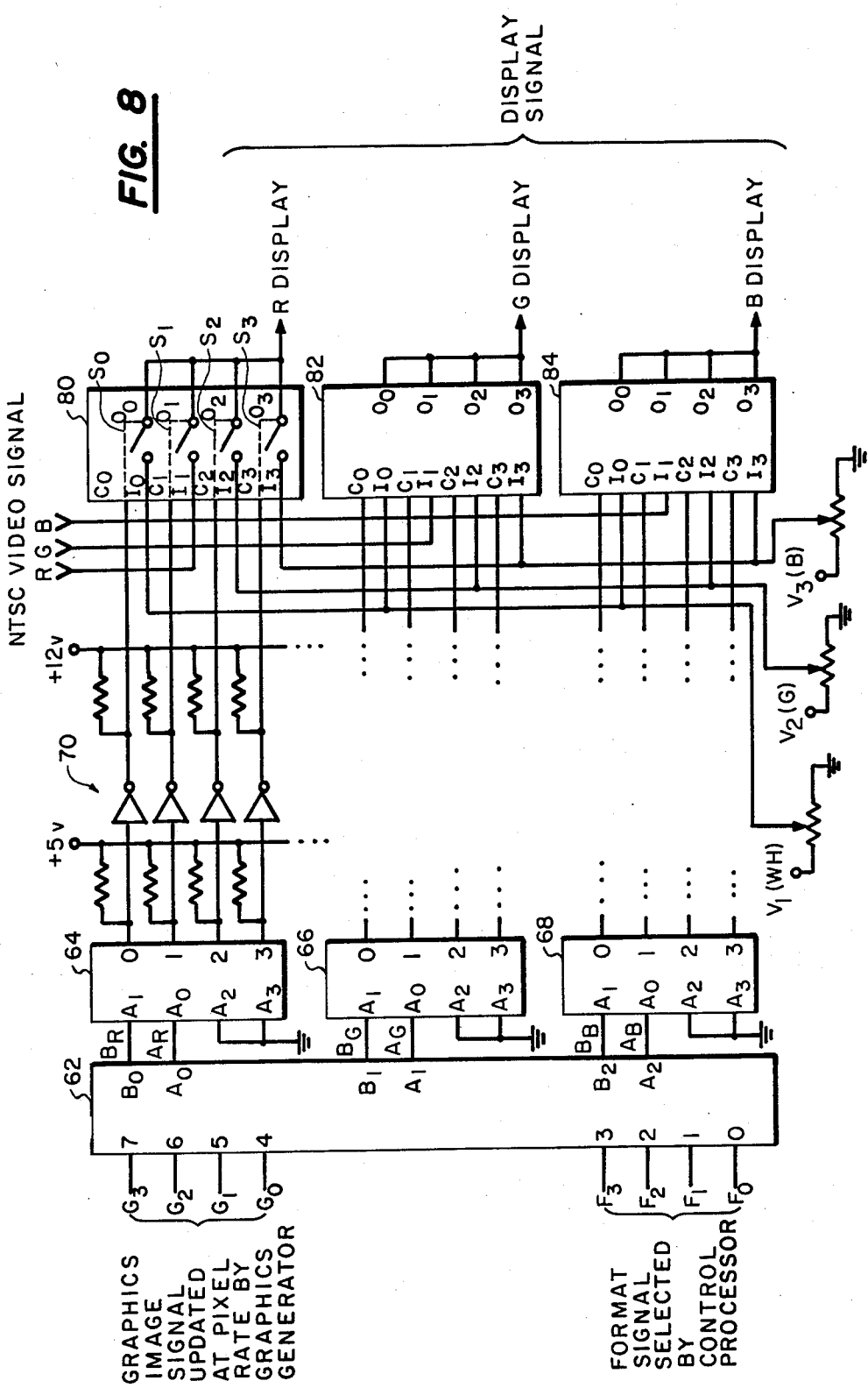
FIG. 8 is a detailed schematic diagram of select logic which is included in the format control and composition circuit.

With reference now to FIGS. 7 and 8, the detailed structure and operation of the apparatus of the invention can be more fully appreciated. The format control and composition circuit 18 includes an information staging and synchronization section 40. This section 40 includes a subaddressable section SUBADDR1 for selection of a video image in the laser disc player 20. A second subaddressable section SUBADDR2 stages format selection data from the control processor 13.

For the selection of video imagery, the control processor 13 address SUBADDR1 on the address portion of the bus 14. At the same time it provides data on the data section of the bus which indicates the storage section of the laser disc containing the desired video image. The data is forwarded as a VIDEO SELECT signal by section SUBADDR1 to the laser disc player 20. The disc player then accesses the selected section on the disc and forwards the stored information to the decoder 22 which renders it into a conventional composite video format including red, green and blue (R, G, B) signals. The composite signals are forwarded as the VIDEO IMAGE signal. As stated above, the decoder 22 also provides a standard composite SYNCHRONIZATION signal comprising horizontal and vertical synchronization segments which are used to synchronize the operation of the display 10 in a conventional manner.

The SYNCHRONIZATION signal is also provided to a synchronization strip circuit 42 which operates in a well-known manner to strip the horizontal synchronization (HSYNCH) signal. As is known, the HSYNCH signal defines the beginning of the application of a horizontal sweep of the DISPLAY signal to the display 10 is displaying a line of a presented scene. The HSYNCH signal is fed to a standard phase comparator 44 which compares it with an oscillating signal having the same frequency as HSYNCH. The comparator circuit 44 develops an error signal indicative of the phase error between HSYNCH and the oscillatory signal which is provided to a pixel clock circuit 46. The pixel clock circuit provides a clock signal which oscillates at the frequency with which the pixels are swept in a horizontal sweep of the DISPLAY signal. The error signal from the comparator circuit 44 therefore synchronizes the phase of the PIXEL CLOCK signal with the occurrence of pixels during the sweep of a horizontal line on the display 10.

The PIXEL CLOCK signal is provided to a synchronization section 50 of the graphics generator 16. The synchronization section 50 responds to the PIXEL CLOCK signal by clocking the operations of an image generation section 52 of the graphics generator 16. The STD-C-GDC-1024 device which forms the graphics generator 16 comprises a preprogrammed microprocessor which responds to high level commands from the control processor 13 to generate the selected graphics image and provide it pixel-by-pixel at the rate of the PIXEL CLOCK signal. The microprocessor of the generator 16 receives the GRAPHICS SELECT signal from the control processor 13 which indicates which image has been selected, the color the image is to be displayed in, and the location in pixel coordinates which the image is to occupy on the screen. The microprocessor of the generator 16 then employs conventional graphics generation algorithms to generate the graphics image at the PIXEL CLOCK rate and to synchronize its output with the operation of the display 10 so that the image is provided at the time the DISPLAY signal is sweeping the display locations which the image is to occupy.

When the graphics generator 16 has responded to the GRAPHICS SELECT signal provided by the control processor 13, and configured itself for provision of the graphics image signal, it sends a signal GDONE back to the control processor 13 indicating that the graphics image selected can now be generated. The signal GDONE is used by the control processor 13 to shift a foreground plane curtain to its normal background position so that the graphics image can be displayed.

The format selected by the control processor 13 is provided s the FORMAT SELECT signal to both the generator 16 and the subaddressable format section SUBADDR2 of the circuit 40, which forwards the signal as a FORMAT signal.

A select logic circuit 60 receives the GRAPHICS IMAGE signal from the generator 16, the FORMAT signal from the subaddressable section SUBADDR2, and the VIDEO IMAGE signal from the NTSC decoder 22. The select logic circuit 60 responds to the FORMAT signal by processing the GRAPHICS IMAGE and VIDEO IMAGE signals to produce a DISPLAY signal which presents a selected image or selected images in the selected format. The control logic circuit 60 also responds to the FORMAT signal by selectively activating the foreground and background planes and implementing the selected background or foreground. The select logic circuit 60 further responds to the FORMAT signal by making the background/graphics plane transparent when the video display format is selected.

As shown in FIG. 8, the select logic circuit 60 comprises a conventional programmable logic array (PLA) which, in the preferred embodiment, comprises an 82S153 device. An array of three decoders 64–68 are connected to the outputs of the PLA 62. In turn, the outputs of the decoders 64–68 are fed through a bank of standard buffer circuits, one of which is indicated by 70, to the inputs of three bilateral switches 80, 82, and 84. Preferably, the decoder circuits comprise 7445 devices, and the switches, 4066 circuits.

The inputs to the PLA 62 include the GRAPHICS IMAGE signal which is a four-bit digital word representative of a current pixel portion of a graphics image and output by the graphics generator 16. The GRAPHICS IMAGE word is updated at the PIXEL CLOCK rate. The four bits of the GRAPHICS IMAGE signal are provided by the graphics generator on separate, parallel lines $G_0$–$G_3$. The FORMAT signal forwarded from the control processor 13 also comprises four separate, parallel bits $F_0$-$F_3$. The FORMAT and GRAPHICS IMAGE signals are connected to respective input nodes of the PLA 62 as shown in FIG. 8.

The output nodes of the PLA 62 comprise three groups of two nodes $A_i$ and $B_i$. Each group of two nodes is assigned to be determinative of the characteristics of a respective portion of the display signal which controls one of the guns on the display 10. Thus, for example, the output nodes $A_0$ and $B_0$ are assigned to control the red gun, and the signals which they provide are denoted as $A_R$ and $B_R$, respectively.

In the explanation which follows, control of the portion of the DISPLAY signal which is fed to the red gun of the display 10 is described, with the understanding that the description also characterizes the respective portions of the DISPLAY signal controlling the green and blue guns as well. Thus, the $A_R$ and $B_R$ signals are fed to the decoder 64 which decodes them by activating a respective one of its output ports. The output ports of the decoder 64 are connected through their respective buffering circuits to the control nodes $C_0$-$C_3$ of the switch 80. The switch 80 also receives, as illustrated, at its input nodes $I_0$-$I_3$ three input voltages $V_1$-$V_3$ and the red portion R of the composite video signal from the NTSC decoder 22. The output nodes of the switch 80, $O_0$-$O_3$, are connected together with the common connection being fed as the red R display portion of the DISPLAY signal. The R portion of the DISPLAY signal is conventionally connected to drive the red gun of the display 10.

Returning to the switches 80-84, the voltages $V_1$-$V_3$ are set at levels corresponding to white (WH), gray (G) and black (B) voltage levels respectively. Thus, if, for example, voltage $V_1$ were passed by the switches 80-84 and connected therethrough to the red, green and blue guns of the display 10, the composite display would be white.

The operation of the select logic circuit, illustrated in FIG. 8, is determined by the combination of the instantaneous states of the GRAPHICS IMAGE and FORMAT signals input to the PLA 62. The input signal combinations define the output states of the PLA 62 according to the table illustrated in FIG. 9. The output of the PLA 62 establishes the scene format, determines the pattern of the background and foreground, maps the GRAPHICS IMAGE signal to a color contained on a color look-up table, and implements the display of the images represented by the VIDEO and GRAPHICS IMAGE signals, if required.

In the table of FIG. 9, the input combinations of the FORMAT and GRAPHICS IMAGE signals are listed vertically. Since these signals are provided on a conventional tri-state databus, each can have one of three possible states. Thus, for example, the $F_0$ bit of the FORMAT signal can assume a high voltage state indicated by H, a low voltage state indicated by L, or an intermediate state indicated by no entry, which is essentially equivalent to placing the $F_0$ line driver in a high input impedance condition. As is conventional, a dash - in the input portion of the table represents a don't-care input condition. In the output portion of the table, the designations H and L refer to high and lower states, respectively.

In the table of FIG. 9 the possible combinations of the GRAPHICS IMAGE and FORMAT signals input to the PLA 62 are numbered in the column 90 labelled "Input Signal Combination" and specified in the eight columns to the right of the column 90. Each input signal combination determines a respective combination of the outputs $A_iB_i$ of the PLA; this is shown in the columns labelled "Display Selection Outputs". In turn, the outputs $A_iB_i$, which are input to the decoders 64-68, determine the outputs of the decoders according to the table of FIG. 10. Thus, for example, when $A_RB_R$ are both low, the 0 output of the decoder 64 is selected which causes the switch 80 to provide voltage $V_1$ as the R portion of the DISPLAY signal. Similarly, when $A_R$ is high and $B_R$ is low, the red portion of the VIDEO IMAGE signal is provided as the R portion of the DISPLAY signal.

It should be evident, then, that each input signal combination of FIG. 9 selects either a respective signal combination of three voltages, or the red, green and blue portions of the VIDEO IMAGE signal, with the selected signals provided through the switches 80-84 as the DISPLAY signal. This is shown in the three right-hand columns of FIG. 9.

When an input combination causes a respective associated combination of voltages to be selected by the switches 80-84, the voltage combination causes the display to assume a respective color. The colors associated with the input and voltage signal combinations are in the column of FIG. 9 to the left of column 90.

Finally, FIG. 9 illustrates how the selected scene m and image displays are implemented. When the $F_0$ bit of the FORMAT signal is high, the display 10 is caused to operate in either the video only or foreground formats. In the video only format, the $F_0$ bit is high, and the $F_1$-$F_3$ drivers are in their switched-off or high-impedance states. This causes the $A_R$ signal to be high and the $B_R$ to be low, which selects output node 1 of the decoder 64 as illustrated in FIG. 10. When the output node 1 of the decoder 64 is selected, it assumes a low voltage state which is inverted by the buffer circuit connected between decoder node 1 and input $C_1$ of the switch 80. This activates the switch $S_1$ of the switch circuit 80, connecting the input node $I_1$ to the output node $O_1$. Since node $I_1$ is connected to the R portion of the VIDEO IMAGE signal, the switch $S_1$ connects the R portion to the red gun of the display 10. As illustrated in FIG. 9, the video only state similarly configures the decoders 66 and 68 as well as the switches 82 and 84 so that the DISPLAY signal comprises the composite VIDEO IMAGE signal from the decoder 22.

When a foreground format is selected, the $F_0$ bit is set high together with one or more of the other FORMAT signal bits $F_1$-$F_3$. When this occurs, the outputs of the PLA 62 cause the switch circuits 80-84 to be set to select some predetermined combination of the voltages $V_1$-$V_3$. The voltage combination is passed through the switch circuits 80-84 as the DISPLAY signal. In the preferred embodiment, a foreground configuration causes the display to present an unbroken, monochromatic scene which cannot be affected by either the GRAPHIC IMAGE or the VIDEO IMAGE signal. The unbroken, monochromatic scene will be displayed until the FORMAT signal is changed by the control processor 13.

When a graphics image is to be presented against either a selected background or a video image, the $F_0$ bit of the FORMAT signal is set to a low L state. When the format combining a video and a graphics image is selected, all of the bits $F_0$-$F_3$ are set low. This is detected by the graphics generator and causes it to set its tri-state logic drivers to provide bits $G_0$-$G_3$ low when the display is sweeping pixels which do not contain portions of the graphics image. Thus, referring again to FIG. 4, when pixels $P_1$ and $P_3$ are being swept by the DISPLAY signal, the graphics generator 16 sets each of its output drivers providing bits $G_0$–$G_3$ to a low state. As illustrated in FIGS. 9 and 10, when this occurs, the outputs of the PLA 62 assume states which cause the switch circuit 80–84 to pass the R, G, and B portions of the composite VIDEO IMAGE signal to the display 10. However, when pixel $P_2$ in the same horizontal line is being swept, the graphics generator 16 will set its GRAPHICS IMAGE signal drivers to produce one of the combinations of high voltage and high impedance signals which are specified in combinations 1–15 of the table in FIG. 9. For example, if the graphics image portion displayed at $P_2$ in FIG. 4 is to be orange, bits $G_0$ and $G_3$ will be set to a high voltage level, while bits $G_1$ and $G_2$ will be set to the high impedance level. This corresponds to input combination 9, which will produce the combination of output signals necessary to cause the switching circuits 80–84 to provide the voltages $V_1$, $V_2$, and $V_3$ to be red, green, and blue guns, respectively, of the display device 10. When the guns are activated by this combination of voltages, the resulting portion of the graphics image occupying the space defined by pixel $P_2$ will be orange. As another example, if the portion of the graphics image occupying the pixel $P_5$ area is to be black, then $G_0$ is set high while bits $G_1$–$G_3$ are set to their high impedance levels. This corresponds to the graphic signal input at state 8 of the PLA table which will result in $V_3$, the black level voltage, being fed to each of the color guns.

When the background format is selected, the graphics generator 16 sets each of the bits $G_0$–$G_3$ to the high impedance level when the display signal is sweeping horizontal line portions which do not contain portions of the graphics image being displayed. This permits the output of the PLA 62 to be determined by the FORMAT signal bits $F_1$–$F_3$. Thus, for example, if, in FIG. 5, the graphics image is to be displayed in a black background and the line containing the pixels $P_1$–$P_3$ is being swept, the input signal bits for the PLA will assume the levels defined for them in input state 16. As the FIG. 9 table shows, input state 16 will cause the switch circuits 80–84 to provide $V_3$, the black voltage level, to the red, green, and blue guns of the display 10. When the display signal is deflected to the pixel $P_2$ location, the bits $G_0$–$G_3$ will assume one of the input combinations 1–15, resulting in the display of the graphics image portion occupying that pixel location.

In view of the operation of the select logic circuit 60, one can regard the DISPLAY signal which it produces as consisting of three parallel data streams, one for each gun of the display device 10. Each data stream consists of a succession of pixel-defining voltages which are synchronized by the GRAPHICS IMAGE signal inputs to the PIXEL CLOCK signal rate. Since PIXEL CLOCK is phased to the NTSC SYNCHRONIZATION signal, the data streams, and thereby the DISPLAY signal, are synchronized with the operation of the display 10 which receives the SYNCHRONIZATION signal from the decoder 22.

Each pixel-defining voltage of a DISPLAY signal color stream is determined by a respective input state of the FIG. 9 table. Thus, the scene-producing characteristics of the DISPLAY signal can be said to be determined by the combination of the GRAPHICS IMAGE and FORMAT signals by the select logic circuit 60.

Obviously, many modifications and variations of the described invention are possible in light of the above teachings. It is therefore to be understood that within the scope of the appended claims the invention may be practiced otherwise than as specifically described.

I claim:

1. An apparatus for providing a display signal capable of operating a display device to display images in plural, selectable scene formats, comprising:

video means for providing a video image signal representative of a video image;

graphics means for providing a graphics image signal representative of a graphics image;

format selection means for selecting a scene format from a plurality of scene formats, each of said scene formats defining a display image including at least a video image or a monochromatic background in combination with said graphics image, and for providing a format signal in a condition indicative of said selected scene format;

level means for providing a plurality of display level signals, each of said display level signals defining a predetermined display intensity level; and display signal means coupled to said video, graphics, format selection, and level means and conditioned by various combinations of said graphics image and format signals for selectively combining said video image signal with said display level signals to produce a display signal corresponding to said selected scene format and capable of actuating a display device to produce said selected scene format.

2. The apparatus of claim 1 wherein one scene format, corresponding to a respective combination of said graphics image and format signals, includes a graphics image displayed on a preselected monochromatic background and said display signal means includes means responsive to said respective combination for selectively combining only said display level signals to produce a display signal corresponding to said one scene format.

3. The apparatus of claim 1 further including means for selecting said graphics image from among a plurality of graphics images to be displayed and providiing a graphics selection signal indicative of said graphics image selection and wherein said graphics means is responsive to said graphics selection signal for generating said selected graphics image.

4. The apparatus of claim 3 wherein one scene format, indicated by a respective foreground condition of said format signal, includes a predetermined foreground with no image, said format selection means includes means for, while said selected graphics image is being generated, providing said foreground condition of said format signal, and said display signal means is responsive to said format signal foreground condition for selectively combining only said display level signals to produce a display signal corresponding to said foreground.

5. The apparatus of claim 4 wherein said format selection means includes means for, when said selected graphics image has been generated, selecting another scene format containing said generated graphics image to replace said foreground format.

6. The apparatus of claim 1 wherein said graphics image and format signals are indicative of where an image is to be displayed in a selected scene format and said display signal means includes:

programmable means for combining said format and graphics image signals to determine when a portion of a video or a graphics image is to be displayed on a respective portion of a selected scene format and for providing a display selection signal indicative of said determination; and switching means responsive to said display selection signal for providing, as a portion of said display signal corresponding to said respective portion, said video image signal or a combination of said display level signals having a predetermined relationship with said display selection signal.

7. The apparatus of claim 1 further including means for operating said display device to display said selected scene in a predetermined, synchronized display mode having a synchronization rate and for synchronizing said display signal means to provide said display signal at said synchronization rate.

8. The apparatus of claim 7 wherein said means for synchronizing includes means in said graphics means for synchronizing the provision of said graphics image signal at said synchronization rate so that said display signal means combines said graphics image and format signals at said synchronization rate.

9. A method for producing a display signal for driving a display device is display images in plural, selectable scene formats in a system including video means for providing a video image signal representative of a video image, graphic means for providing a graphics image signal representative of a graphics image, and level means for providing a plurality of display level signals, each of said display level signals defining a predetermined display intensity level, comprising the steps of:

selecting a scene format defining a display image including at least a video image or a background in combination with said graphics image and producing a format signal conditioned to indicate said selected scene format;

combining said graphics image and format signals to determine according to a predetermined combinatorial relationship between said graphics image and format signals a respective combination of said video image and display level signals which corresponds to said selected scene format; and providing said respective combination of said video image and display level signals as said display signal.

10. The method of claim 9 further including selecting a foreground scene format containing no image and conditioning said format signal to indicate said foreground scene format, determining a respective combination of display level signals which corresponds to said foreground scene format, and providing said respective combination of display level signals as said display signal.

* * * * *